United States Patent
Sun et al.

(10) Patent No.: US 9,740,246 B2
(45) Date of Patent: Aug. 22, 2017

(54) TOUCHPAD SUPPORTING DEVICE

(71) Applicant: PEGATRON CORPORATION, Taipei (TW)

(72) Inventors: Wei-Chen Sun, Taipei (TW); Chun-Sheng Li, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 30 days.

(21) Appl. No.: 14/949,091

(22) Filed: Nov. 23, 2015

(65) Prior Publication Data
US 2016/0154427 A1    Jun. 2, 2016

(30) Foreign Application Priority Data

Dec. 2, 2014 (TW) .............................. 103141804 A

(51) Int. Cl.
*G06F 1/00* (2006.01)
*G06F 1/16* (2006.01)

(52) U.S. Cl.
CPC ............ *G06F 1/169* (2013.01); *G06F 1/1656* (2013.01)

(58) Field of Classification Search
CPC ........ G06F 1/1643; G06F 1/041; G06F 1/169; G06F 1/1616; G06F 3/03547
USPC ....... 345/173; 312/223.1, 223.2; 361/679.09, 361/679.1, 679.18, 679.27
See application file for complete search history.

(56) References Cited

U.S. PATENT DOCUMENTS

| | | | | |
|---|---|---|---|---|
| 6,798,647 B2* | 9/2004 | Dickie | ................... | G06F 1/1616 345/158 |
| 6,933,921 B2* | 8/2005 | Yasuda | ................... | G06F 1/1616 345/157 |
| 7,119,291 B2* | 10/2006 | Sun | ........................ | G06F 1/169 200/343 |
| 7,123,471 B2* | 10/2006 | Wang | ...................... | G06F 1/162 361/679.09 |
| 7,233,314 B2* | 6/2007 | Shih | ....................... | G06F 1/1616 312/223.2 |
| 7,633,492 B2* | 12/2009 | Hsu | ....................... | G06F 3/03547 345/173 |
| 8,139,347 B2* | 3/2012 | Chiang | .................. | G06F 1/169 361/679.18 |
| 8,456,437 B2* | 6/2013 | Chiang | ............... | G06F 3/03547 178/18.03 |

(Continued)

FOREIGN PATENT DOCUMENTS

| | | |
|---|---|---|
| TW | M454586 U | 6/2013 |
| TW | M464740 U | 11/2013 |

*Primary Examiner* — Janet M Wilkens
(74) *Attorney, Agent, or Firm* — Muncy, Geissler, Olds & Lowe, P.C.

(57) ABSTRACT

The touchpad supporting device includes a frame and a supporting body. The frame has an upper surface, a lower surface and a first opening defined through the upper surface and the lower surface. The supporting body is provided for supporting the touch pad, and the supporting body has a connecting end and a distal end opposite to each other. The supporting body is extended obliquely from an inner sidewall at one side of the first opening and close to the lower surface toward an inner sidewall at another side of the first opening and close to the upper surface. The connecting end connects to the inner sidewall at one side of the first opening of the frame. The distal end is not coplanar with the lower surface.

12 Claims, 7 Drawing Sheets

(56) References Cited

U.S. PATENT DOCUMENTS

| | | | | |
|---|---|---|---|---|
| 9,030,839 B2* | 5/2015 | Leggett | ................... | G06F 1/182 |
| | | | | 345/173 |
| 9,069,394 B2* | 6/2015 | Clayton | .............. | G06F 3/03547 |
| 9,513,673 B2* | 12/2016 | Hotelling | .............. | G06F 1/1616 |
| 2008/0202824 A1* | 8/2008 | Philipp | ..................... | G06F 3/02 |
| | | | | 178/18.01 |
| 2009/0174678 A1* | 7/2009 | Mathew | ................ | G06F 1/1616 |
| | | | | 345/173 |
| 2009/0302722 A1* | 12/2009 | Mihara | ................. | G06F 1/1616 |
| | | | | 312/223.2 |
| 2011/0075336 A1* | 3/2011 | Chiang | ................... | G06F 1/169 |
| | | | | 361/679.02 |
| 2011/0149534 A1* | 6/2011 | Hamada | ................. | G06F 1/169 |
| | | | | 361/756 |
| 2011/0249383 A1* | 10/2011 | Horii | ....................... | G06F 1/169 |
| | | | | 361/679.01 |
| 2013/0286625 A1* | 10/2013 | Huang | ................ | H05K 5/0086 |
| | | | | 361/809 |
| 2013/0322026 A1* | 12/2013 | Huang | .................... | H05K 7/02 |
| | | | | 361/728 |
| 2013/0328741 A1* | 12/2013 | Degner | ................ | G06F 1/1658 |
| | | | | 343/841 |
| 2013/0329359 A1* | 12/2013 | Andre | ................... | G06F 1/1616 |
| | | | | 361/679.55 |
| 2014/0133112 A1* | 5/2014 | Kao | ....................... | G06F 1/1613 |
| | | | | 361/755 |
| 2014/0313648 A1* | 10/2014 | Yang | ....................... | G06F 1/169 |
| | | | | 361/679.01 |
| 2015/0169005 A1* | 6/2015 | Yanagida | ................ | G06F 1/169 |
| | | | | 345/173 |
| 2017/0017266 A1* | 1/2017 | Kitamura | ............... | G06F 1/169 |

* cited by examiner

TOUCHPAD SUPPORTING DEVICE

CROSS-REFERENCE TO RELATED APPLICATIONS

This Non-provisional application claims priority under 35 U.S.C. §119(a) on Patent Application No(s). 103141804 filed in Taiwan, Republic of China on Dec. 2, 2014, the entire contents of which are hereby incorporated by reference.

BACKGROUND

Technology Field

The disclosure relates to a touchpad supporting device and, more particularly, to a touchpad supporting device for a touch pad of a notebook computer.

Description of the Related Art

In general, a notebook computer is equipped with a touch pad for controlling a cursor of a mouse. The touch pad provides a keying area for user's pressure, and it is used as the left and right mouse buttons. Please refer to FIG. 8, and the touch pad 50 is supported by a supporting device 60.

The supporting device 60 includes a frame 61, a supporting plate 62 and two elastic plates 63. An opening 611 is formed on the frame 61. The supporting plate 62 is extended sideward from a sidewall of the opening 611 toward the inside of the opening 611, and the supporting plate 62 is located inside the opening 611. The two elastic plates 63 are extended obliquely and upwardly from another two opposite sidewalls toward a top surface of the frame 61, the two elastic plates 63 are located inside the opening 611, and ends of the two elastic plates 63 are not coplanar with the supporting plate 62.

When the touch pad 50 is mounted on the supporting device 60, the touch pad 50 is directly set on a top surface of the supporting plate 62, and the ends of the two elastic plates 63 sustain upwardly against a bottom surface of the touch pad 50. Thus, the touch pad 50 is set suspended on the top of the supporting plate 62, and a gap is formed between the touch pad 50 and the top surface of the supporting plate 62.

The touch pad 50 also has two engaging blocks 51. The two engaging blocks 51 are extended sideward from one side of the touch pad 50 close to the bottom surface, and the two engaging blocks 51 are parallel. The two engaging blocks 51 are provided for hooking the bottom surface of the frame 61, such that the touch pad 50 protruding from the top surface of the frame 61 due to the pushing of the two elastic plates can be avoided, which may cause the unevenness at the boundaries of the touch area and non-touch area and influence the operation of the user.

When the user uses the touch pad 50 to control the cursor of the mouse and needs to press the touch pad 50 to perform the functionality of left and right mouse buttons, the gap between the touch pad 50 and the supporting plate 62 of the frame 60 allows the touch pad 50 moving downward until the touch pad 50 touches the supporting plate 62. When the user doesn't press the touch pad 50, the resilience of the two elastic plates 63 is released, the touch pad 50 is sustained upwardly, and the gap between the touch pad 50 and the supporting plate 62 is recovered for next pressing. Thus, the touch pad 50 provides the functionality of left and right mouse buttons.

Please refer to FIG. 9. However, when making the two elastic plates 63, it is difficult to ensure that the ends of the two elastic plates 63 are coplanar. If the ends of the two elastic plates 63 are not coplanar, the sustaining forces on the touch pad 50 will be different. When performing the functionality of the left and right mouse buttons, the touch pad 50 will easily incline to one side, and influence the user's operation. Thus, the existing supporting device 60 needs to be further improved.

Additionally, another existing method is to set a metal elastic plate between the touch pad 50 and the frame 60. By utilizing the elasticity of the metal elastic plate, the functionality of the left and right mouse buttons can be performed. However, the additional setting of the metal elastic plate will increase the material cost, and increase the cost of manufacture.

SUMMARY

A main objective of the invention is to provide a touchpad supporting device to avoid the slant of a touch pad as it is used.

To achieve the above objectives, the main technique of the invention is to provide the touchpad supporting device for supporting a touch pad. The touchpad supporting device includes a frame and a supporting body. The frame has an upper surface, a lower surface and a first opening defined through the upper surface and the lower surface. The supporting body is provided for supporting the touch pad, and the supporting body has a connecting end and a distal end opposite to each other. The supporting body is extended obliquely from an inner sidewall at one side of the first opening and close to the lower surface toward an inner sidewall at another side of the first opening and close to the upper surface. The connecting end connects to the inner sidewall at one side of the first opening of the frame. The distal end is not coplanar with the lower surface of the frame.

The touch pad is set on a top surface of the supporting body. The supporting body includes a plurality of sustaining portions, and the sustaining portions are extended outwardly and respectively from two opposite sides of the distal end. The touchpad supporting device further includes a case. The case is provided for covering on the upper surface of the frame. A second opening is formed on the case, and the second opening is corresponding to the first opening. The sustaining portions of the supporting body sustain against a bottom surface of the case.

A protrusion is formed on a top surface of each sustaining portion, and the protrusion sustains against the bottom surface of the case.

A stopper is further set in the first opening of the frame. The stopper is extended sideward from the lower surface of the frame into the first opening. The stopper and the supporting body are set apart and are not overlapping.

The angle between the supporting body and the lower surface of the frame is larger than 3.5 degrees.

The supporting body and the frame are integrally formed to be a member.

The supporting body and the frame are made of plastic material.

When the notebook is assembled, the touch pad is mounted on the top surface of the supporting body. By the supporting body being set obliquely, and the distal end of the supporting body sustains the bottom surface of the touch pad. The distal end is not coplanar with the lower surface of frame, and a gap is formed between the distal end and the lower surface. Thus, when the user presses the touch pad, there is a space to allow the touch pad moving downward. When the user doesn't press the touch pad, the resilience of the supporting body is released and the supporting body sustains against the touch pad. The gap between the distal end and the lower surface is recovered for next pressing.

In the invention, the supporting body directly sustains against the touch pad, instead of additionally setting two elastic plates for sustaining. Thus, when the touch pad is pressed, the slant of the touch pad caused by the two elastic plates being not coplanar is avoided

DETAILED DESCRIPTION

The advantages and innovative features of the invention will become more apparent from the following preferred embodiments.

Figure 1:
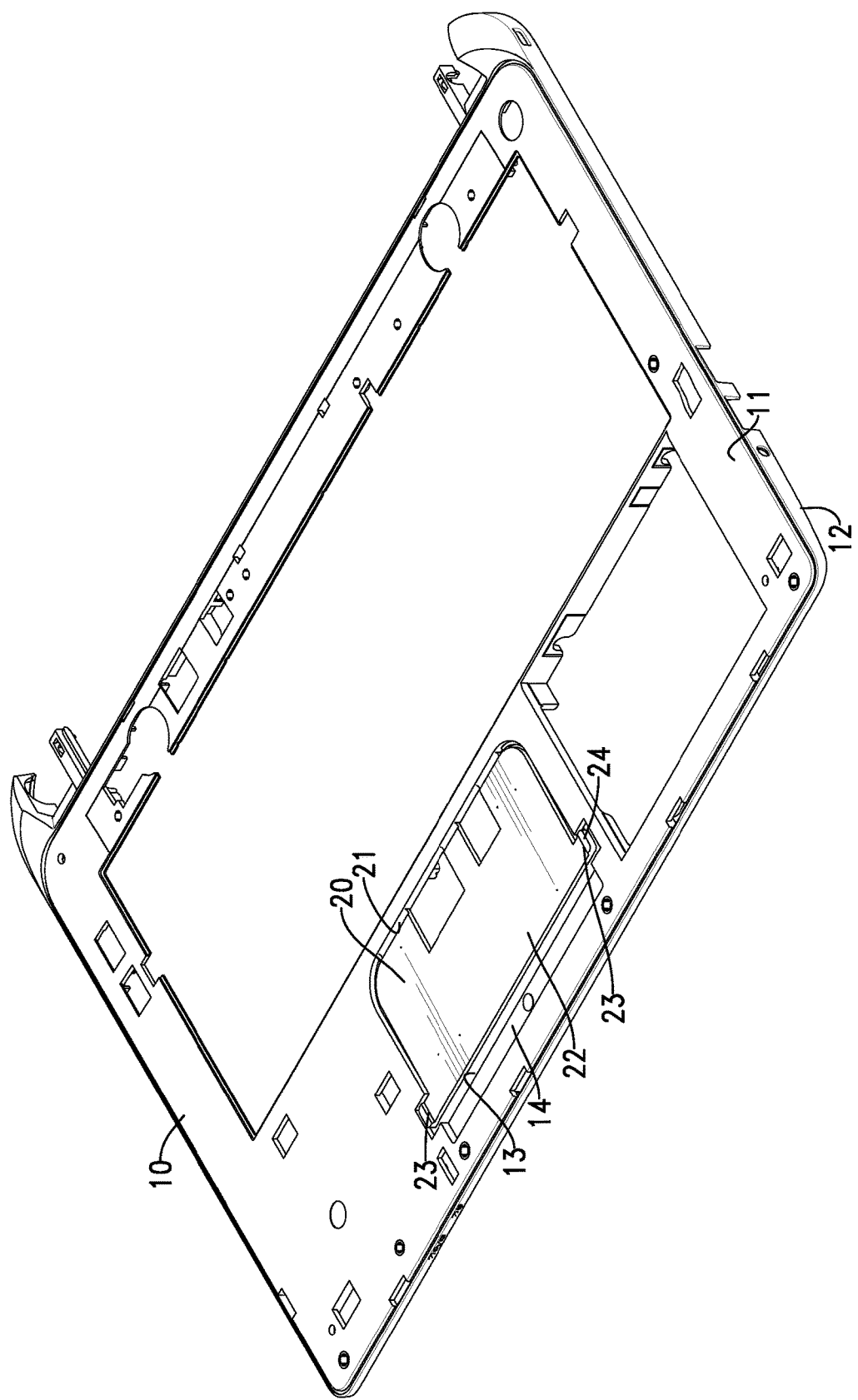
FIG. 1 is a schematic perspective view of a touchpad supporting device according to a preferred embodiment of the invention.
Figure 2:
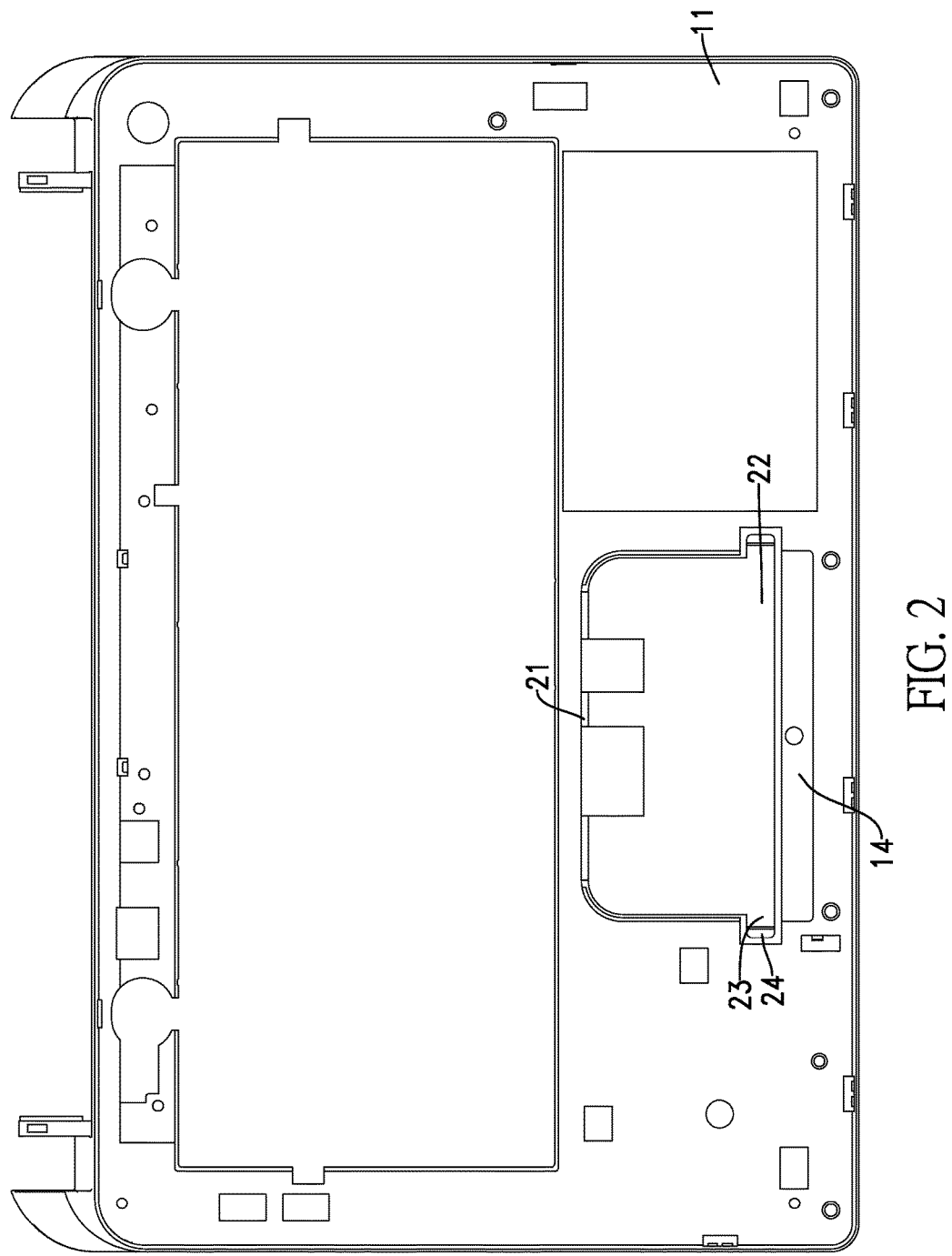
FIG. 2 is a schematic top view of a touchpad supporting device according to a preferred embodiment of the invention.

Refer to FIG. 1 and FIG. 2, a touchpad supporting device is disclosed according to an embodiment of the invention. The touchpad supporting device is provided for supporting a touch pad (not shown), and the touchpad supporting device includes a frame 10 and a supporting body 20.

The frame 10 has an upper surface 11 and a lower surface 12 opposite to each other, and the frame 10 has a first opening 13 defined through the upper surface 11 and the lower surface 12. The supporting body 20 is provided for supporting the touch pad, and the supporting body 20 has a connecting end 21 and a distal end 22 opposite to each other. The supporting body 20 is extended obliquely and upwardly from an inner sidewall at one side of the first opening 13. The connecting end 21 connects to the inner sidewall at one side of the first opening 13 of the frame 10. The distal end 22 is not coplanar with the lower surface 12 of the frame 10.

Figure 3:
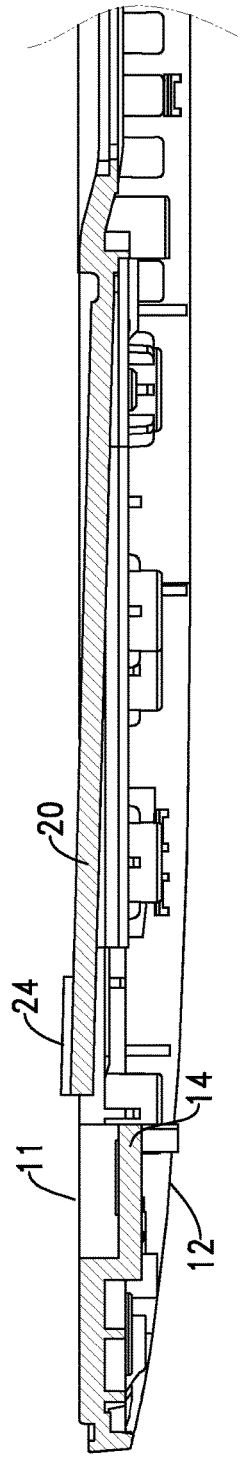
FIG. 3 is a schematic cross-sectional view of a touchpad supporting device according to a preferred embodiment of the invention.

Refer to FIG. 3, and the supporting body 20 is extended obliquely from an inner sidewall at one side of the first opening 13 and close to the lower surface 12 toward an inner sidewall at another side of the first opening 13 and close to the upper surface 11. Thus, the distal end 22 is not coplanar with the lower surface 12, and a gap is formed between the distal end 22 and the lower surface 12. When a notebook is assembled, the touch pad is set on a top surface of the supporting body 20 and the distal end 22 of the supporting body 20 is utilized to sustain against the touch pad. When a user presses the touch pad, there is a space to allow the touch pad moving downward, so as to provide a tactile effect as left and right mouse buttons are pressed. In a preferred embodiment of the invention, the angle between the supporting body 20 and the lower surface 12 of the frame 10 is larger than 3.5 degrees.

When the user presses the touch pad, the touch pad and the supporting body 20 are pressed downward simultaneously, thus the keying functionality is provided. When the user doesn't press the touch pad, the resilience of the supporting body 20 is released and the supporting body 20 sustains against the touch pad. The touch pad returns to the original position, and the gap between the distal end 22 and the lower surface 12 is retained for next pressing. In a preferred embodiment of the invention, the supporting body 20 is used to sustain against the touch pad, instead of using two elastic plates setting on the opposite sides sustain against the touch pad respectively in a conventional manner. Thus, when the user presses the touch pad, the slant of the touch pad can be avoided effectively.

Figure 4:
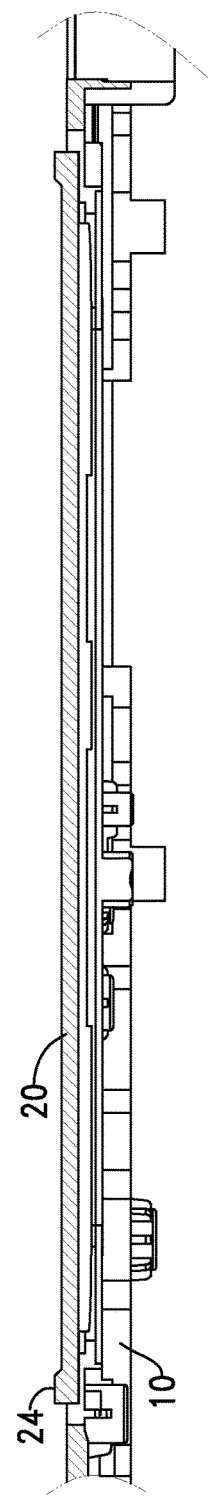
FIG. 4 is another schematic cross-sectional view of a touchpad supporting device according to a preferred embodiment of the invention.

Please refer to FIG. 2 and FIG. 4, a sustaining portion 23 is extended outwardly from two opposite sides of the distal end 22 of the supporting body 20. Please refer to FIG. 5, and the touchpad supporting device further includes a case 30. The case 30 is provided for covering on the upper surface 11 of the frame 10, and the case 30 has a second opening 31. The second opening 31 is corresponding to the first opening 13. The top surfaces of the sustaining portions 23 of the supporting body 20 directly sustain against a bottom surface of the case 30.

In addition, please refer to FIG. 2 and FIG. 4, protrusions 24 is formed on the top surfaces of the two sustaining portions 23, respectively. The protrusions 24 are protruded from the upper surface 11 of the frame 10. Please refer to FIG. 5, when the case 30 is mounted on the upper surface 11 of the frame 10, the protrusions 24 sustain against the bottom surface of the case 30.

Figure 5:
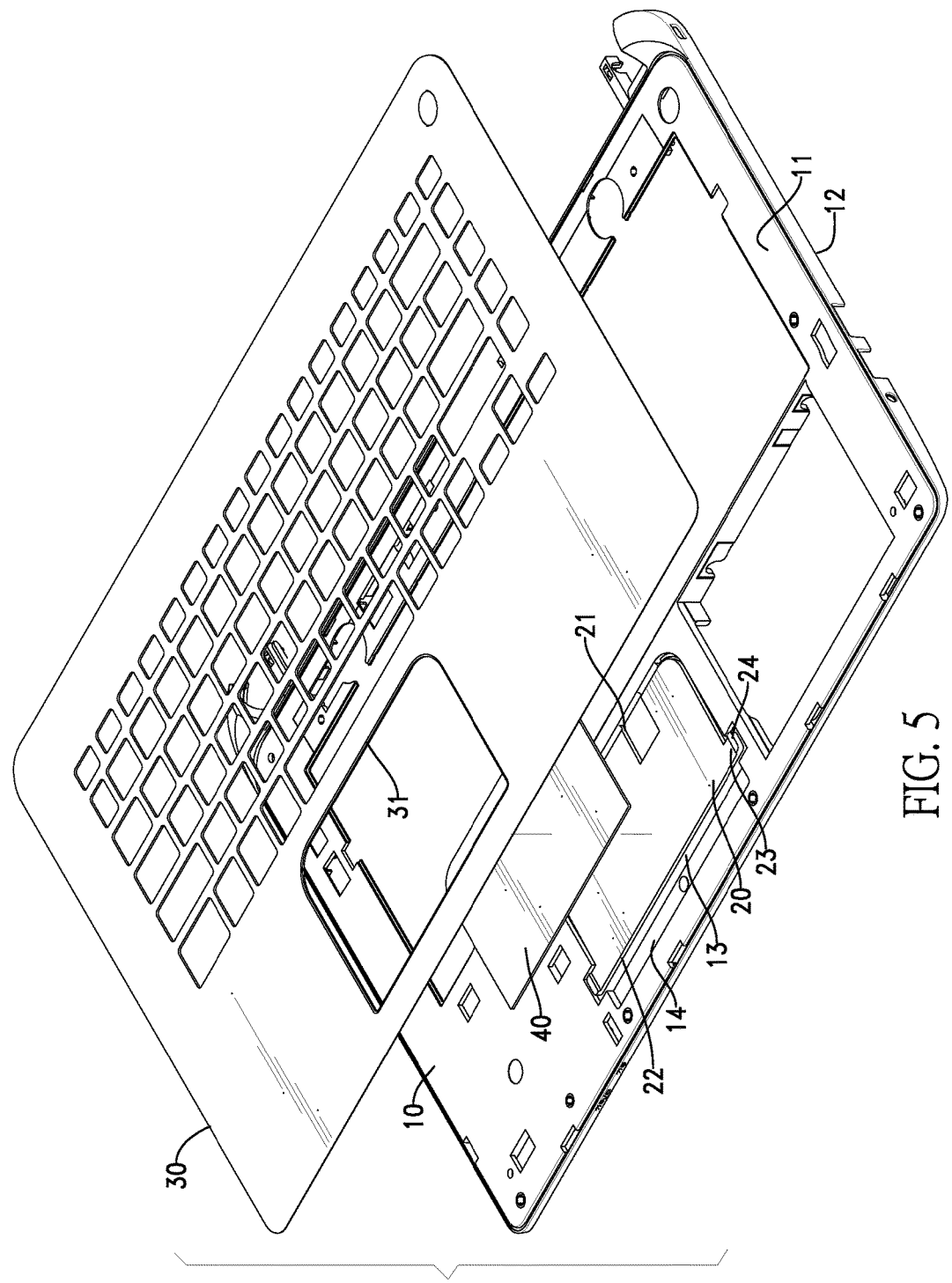
FIG. 5 is a schematic view of assembling a touchpad supporting device according to a preferred embodiment of the invention.
Figure 6:
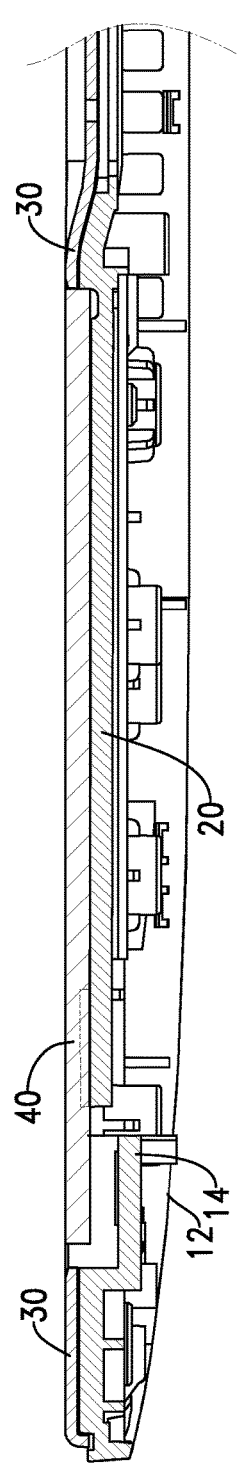
FIG. 6 is a schematic cross-sectional view of a touchpad supporting device after the touchpad supporting device is assembled according to a preferred embodiment of the invention.
Figure 7:
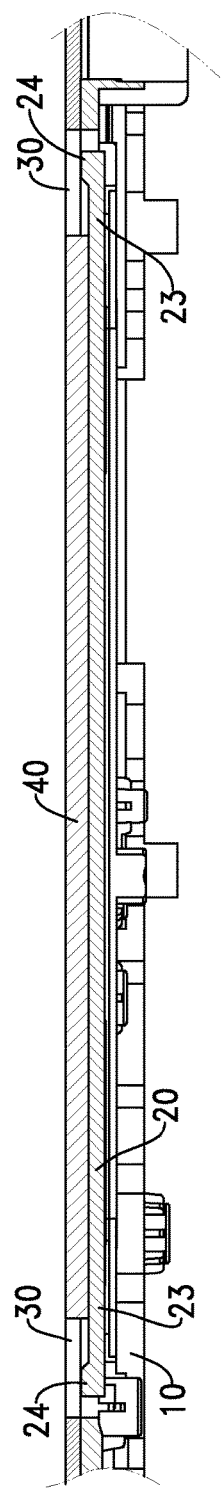
FIG. 7 is another schematic cross-sectional view of a touchpad supporting device after the touchpad supporting device is assembled according to a preferred embodiment of the invention.
Figure 8:
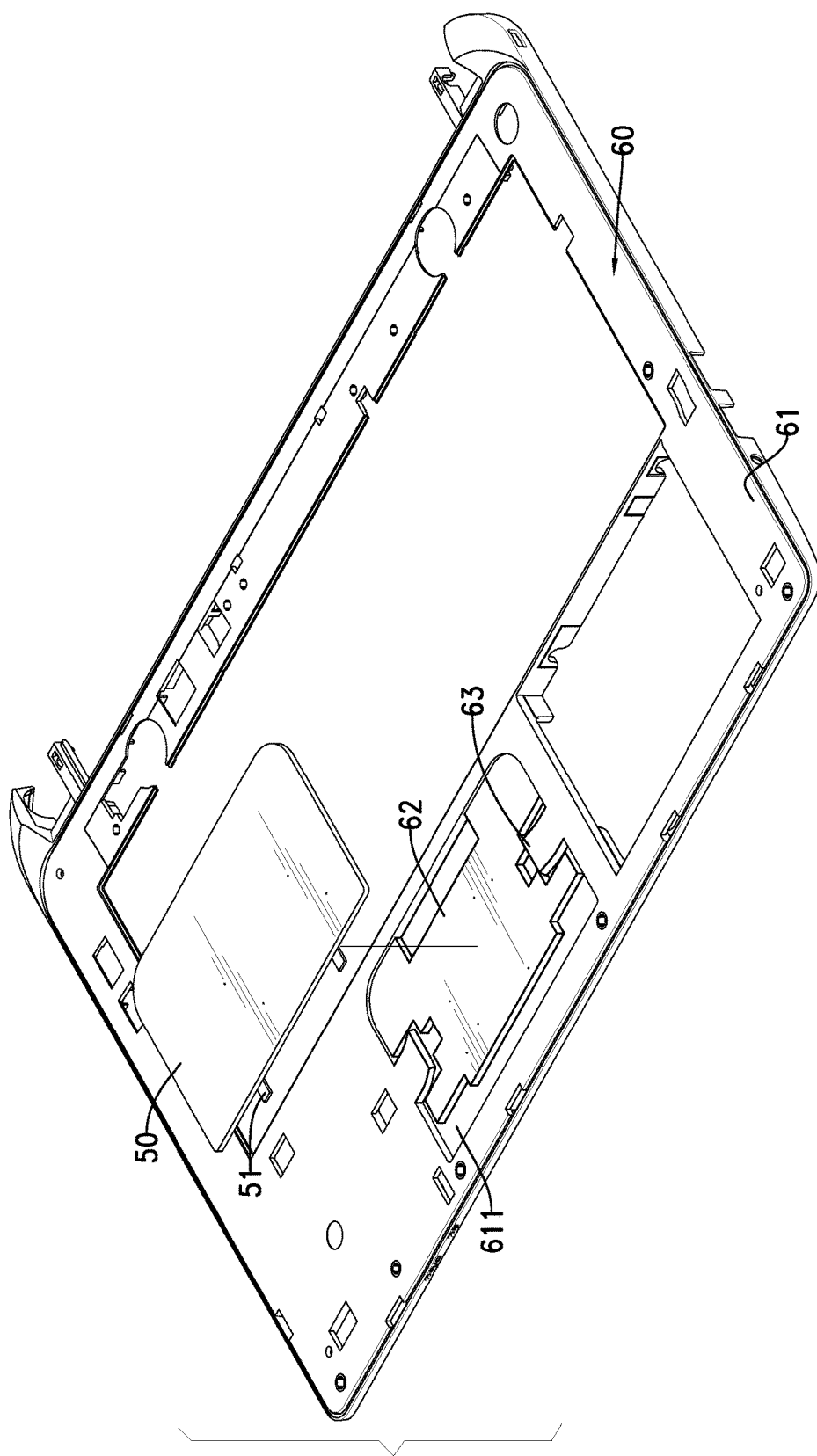
FIG. 8 is a schematic perspective view of a conventional touchpad supporting device.
Figure 9:
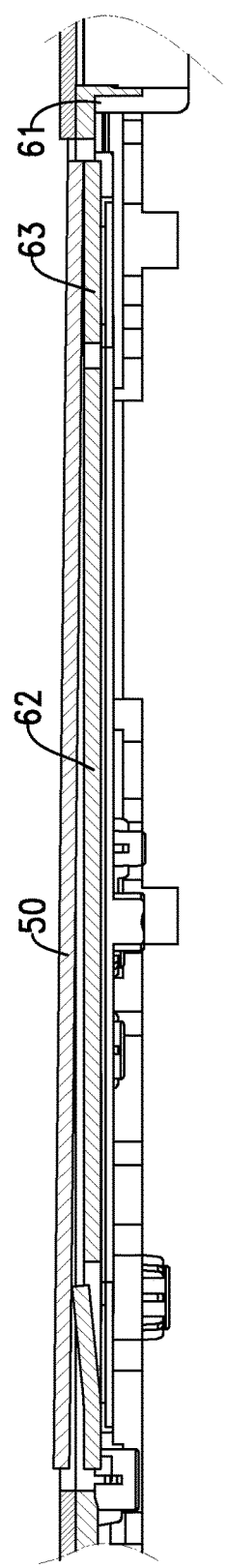
FIG. 9 is a schematic cross-sectional view of a conventional touchpad supporting device when the conventional touchpad supporting device is used.

Please refer to FIG. 5-7, when the notebook is assembled, the touch pad 40 is set on the top surface of the supporting body 20, and the case 30 covers on the upper surface 11 of the frame 10, such that the touch pad 40 is set and held between the case 30 and the frame 10. By using the protrusions 24 of the supporting body 20 sustaining against the bottom surface of the case 30, the height of the distal end 22 of the supporting body is limited. Thus, after the touch pad 40 is assembled, the touch pad 40 will not protrude from the top surface of the case 30. The touch pad 40 and the top surface of the case 30 are aligned, and it can avoid the influence via the unevenness. In a preferred embodiment of the invention, the frame 10 and the supporting body 20 are so called the frame of component C. The case 30 is so called an external appearance part. The frame 10, the supporting body 20, the case 30 and the touch pad 40 is assembled to be a member, so called component C. Besides, the supporting body 20 and the frame 10 are integrally formed to be a member, and the supporting body 20 and the frame 10 are made of plastic material.

Furthermore, a stopper 14 is further set in the first opening 13 of the frame 10. The stopper 14 is extended sideward from the lower surface 12 of the frame 10 into the first opening 13. The stopper 14 and the supporting body 20 are set apart and are not overlapping. By the setting of the stopper 14, when the user presses the touch pad 40 and the supporting body 20 is pressed downward, the touch pad 40 exceeds the supporting body 20, and the touch pad 40 and the supporting body 20 are partially overlapping. Thus, the bottom surface of the touch pad 40 is capable of touching the stopper 14 and stopped by the stopper 14. This can avoid the touch pad 40 being over pressed, which may cause the breaking of the supporting body 20 or the pressure to other components in the notebook.

The foregoing descriptions of embodiments of the invention have been presented only for purposes of illustration and description. They are not intended to be exhaustive or to limit the invention to the forms disclosed. Accordingly, many modifications and variations will be apparent to practitioners skilled in the art. Additionally, the above disclosure is not intended to limit the invention. The scope of the present invention is defined by the appended claims.

What is claimed is:

1. A touchpad supporting device for supporting a touch pad, comprising:
   a frame having an upper surface, a lower surface and a first opening defined through the upper surface and the lower surface; and
   a supporting body for supporting the touch pad, the supporting body having a connecting end and a distal end opposite to each other, the supporting body being extended obliquely from an inner sidewall at one side of the first opening and close to the lower surface toward an inner sidewall at another side of the first opening and close to the upper surface, the connecting end connecting to the inner sidewall at one side of the first opening of the frame, the distal end being not coplanar with the lower surface of the frame,
   wherein a top surface of the supporting body is provided for supporting the touch pad,
   wherein the supporting body includes a plurality of sustaining portions, and the sustaining portions are extended outwardly and respectively from two opposite sides of the distal end, the touchpad supporting device further comprises:
   a case for covering on the upper surface of the frame, a second opening being formed on the case, the second opening being corresponding to the first opening, and the sustaining portions of the supporting body sustaining against a bottom surface of the case.

2. The touchpad supporting device according to claim 1, wherein a protrusion is formed on a top surface of each sustaining portion, and the protrusion sustains against the bottom surface of the case.

3. The touchpad supporting device according to claim 2, wherein a stopper is set in the first opening of the frame, the stopper is extended sideward from the lower surface of the frame into the first opening, and the stopper and the supporting body are set apart and are not overlapping.

4. The touchpad supporting device according to claim 2, wherein the angle between the supporting body and the lower surface of the frame is larger than 3.5 degrees.

5. The touchpad supporting device according to claim 2, wherein the supporting body and the frame are integrally formed to be a member.

6. The touchpad supporting device according to claim 2, wherein the supporting body and the frame are made of plastic material.

7. The touchpad supporting device according to claim 1, wherein a stopper is set in the first opening of the frame, the stopper is extended sideward from the lower surface of the frame into the first opening, and the stopper and the supporting body are set apart and are not overlapping.

8. The touchpad supporting device according to claim 7, wherein the supporting body and the frame are integrally formed to be a member.

9. The touchpad supporting device according to claim 7, wherein the supporting body and the frame are made of plastic material.

10. The touchpad supporting device according to claim 1, wherein the angle between the supporting body and the lower surface of the frame is larger than 3.5 degrees.

11. The touchpad supporting device according to claim 1, wherein the supporting body and the frame are integrally formed to be a member.

12. The touchpad supporting device according to claim 1, wherein the supporting body and the frame are made of plastic material.

* * * * *